(12) United States Patent
Hathiramani et al.

(10) Patent No.: US 11,528,707 B2
(45) Date of Patent: Dec. 13, 2022

(54) PRIMARY AND SECONDARY BEAMS BASED CHANNEL ACCESS

(71) Applicant: Nokia Technologies Oy, Espoo (FI)

(72) Inventors: Navin Hathiramani, Coppell, TX (US); Timo Erkki Lunttila, Espoo (FI); Arto Lehti, Massy (FR)

(73) Assignee: Nokia Technologies Oy, Espoo (FI)

( * ) Notice: Subject to any disclaimer, the term of this patent is extended or adjusted under 35 U.S.C. 154(b) by 83 days.

(21) Appl. No.: 17/239,764

(22) Filed: Apr. 26, 2021

(65) Prior Publication Data

US 2022/0346076 A1    Oct. 27, 2022

(51) Int. Cl.
*H04W 72/04* (2009.01)
*H04W 72/12* (2009.01)
*H04W 16/14* (2009.01)

(52) U.S. Cl.
CPC ......... *H04W 72/046* (2013.01); *H04W 16/14* (2013.01); *H04W 72/042* (2013.01); *H04W 72/0406* (2013.01); *H04W 72/1273* (2013.01)

(58) Field of Classification Search
CPC ............... H04W 72/046; H04W 16/14; H04W 72/0406; H04W 72/042; H04W 72/1273
USPC ........................................ 370/310, 328, 329
See application file for complete search history.

(56) References Cited

U.S. PATENT DOCUMENTS

| | | | |
|---|---|---|---|
| 2019/0181941 A1* | 6/2019 | Kim | H04W 72/042 |
| 2021/0058967 A1* | 2/2021 | Oteri | H04W 72/042 |
| 2021/0092723 A1* | 3/2021 | Yerramalli | H04L 25/0216 |

FOREIGN PATENT DOCUMENTS

| | | |
|---|---|---|
| EP | 3 349 467 A1 | 7/2018 |
| WO | WO-2014/106692 A1 | 7/2014 |
| WO | WO-2017/140945 A1 | 8/2017 |

OTHER PUBLICATIONS

3GPP TSG-RAN WG1 Meeting #104-e "Summary #2 of email discussions [ 104-e-NR-feMIMO-02] for mTRP PDCCH Enhancements" R1-2101839. E-Meeting Jan. 25-Feb. 5, 2021.

* cited by examiner

*Primary Examiner* — Obaidul Huq
(74) *Attorney, Agent, or Firm* — Joseph C. Drish; Harrington & Smith

(57) ABSTRACT

An apparatus includes a processor; and a non-transitory memory including computer program code; wherein the memory and the computer program code are configured to, with the processor, cause the apparatus at least to: report at least two reported beams to a radio node; receive a configuration from the radio node for at least two configured beams, the at least two configured beams comprising a primary beam and at least one secondary beam; attempt to decode data based on the primary beam, per monitoring occasion for a downlink channel, based on the received configuration; in response to a failure to decode the data based on the primary beam, attempt to decode the data based on the at least one secondary beam over the downlink channel; and transmit or receive information over a scheduling occasion using at least one of the at least two configured beams following a successful decoding attempt.

20 Claims, 9 Drawing Sheets

PRIMARY AND SECONDARY BEAMS BASED CHANNEL ACCESS

TECHNICAL FIELD

The examples and non-limiting embodiments relate generally to communications and, more particularly, to primary and secondary beams based channel access.

BACKGROUND

It is known to implement beamforming in a communication network.

SUMMARY

In accordance with an aspect, an apparatus includes at least one processor; and at least one non-transitory memory including computer program code; wherein the at least one memory and the computer program code are configured to, with the at least one processor, cause the apparatus at least to: report at least two reported beams to a radio node; receive a configuration from the radio node for at least two configured beams, the at least two configured beams comprising a primary beam and at least one secondary beam; attempt to decode data based on the primary beam, per monitoring occasion for a downlink channel, based on the received configuration; in response to a failure to decode the data based on the primary beam, attempt to decode the data based on the at least one secondary beam over the downlink channel; and transmit or receive information over a scheduling occasion using at least one of the at least two configured beams following a successful decoding attempt.

In accordance with an aspect, an apparatus includes at least one processor; and at least one non-transitory memory including computer program code; wherein the at least one memory and the computer program code are configured to, with the at least one processor, cause the apparatus at least to: receive from a user equipment a report related to at least two reported beams; send to the user equipment a configuration for at least two configured beams, the at least two configured beams comprising a primary beam and at least one secondary beam; select a beam for the user equipment to transmit, of the at least two reported beams or the at least two configured beams, per scheduling occasion; in response to determining that the selected beam for transmission is not a primary serving beam for the user equipment but is among the at least two reported beams, determine at least one capability of the user equipment; and schedule a transmission opportunity for the user equipment based on the at least one capability of the user equipment using the at least one secondary beam, such that the user equipment has sufficient time to decode data per monitoring occasion.

In accordance with an aspect, a method includes reporting at least two reported beams to a radio node; receiving a configuration from the radio node for at least two configured beams, the at least two configured beams comprising a primary beam and at least one secondary beam; attempting to decode data based on the primary beam, per monitoring occasion for a downlink channel, based on the received configuration; in response to a failure to decode the data based on the primary beam, attempting to decode the data based on the at least one secondary beam over the downlink channel; and transmitting or receiving information over a scheduling occasion using at least one of the at least two configured beams following a successful decoding attempt.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
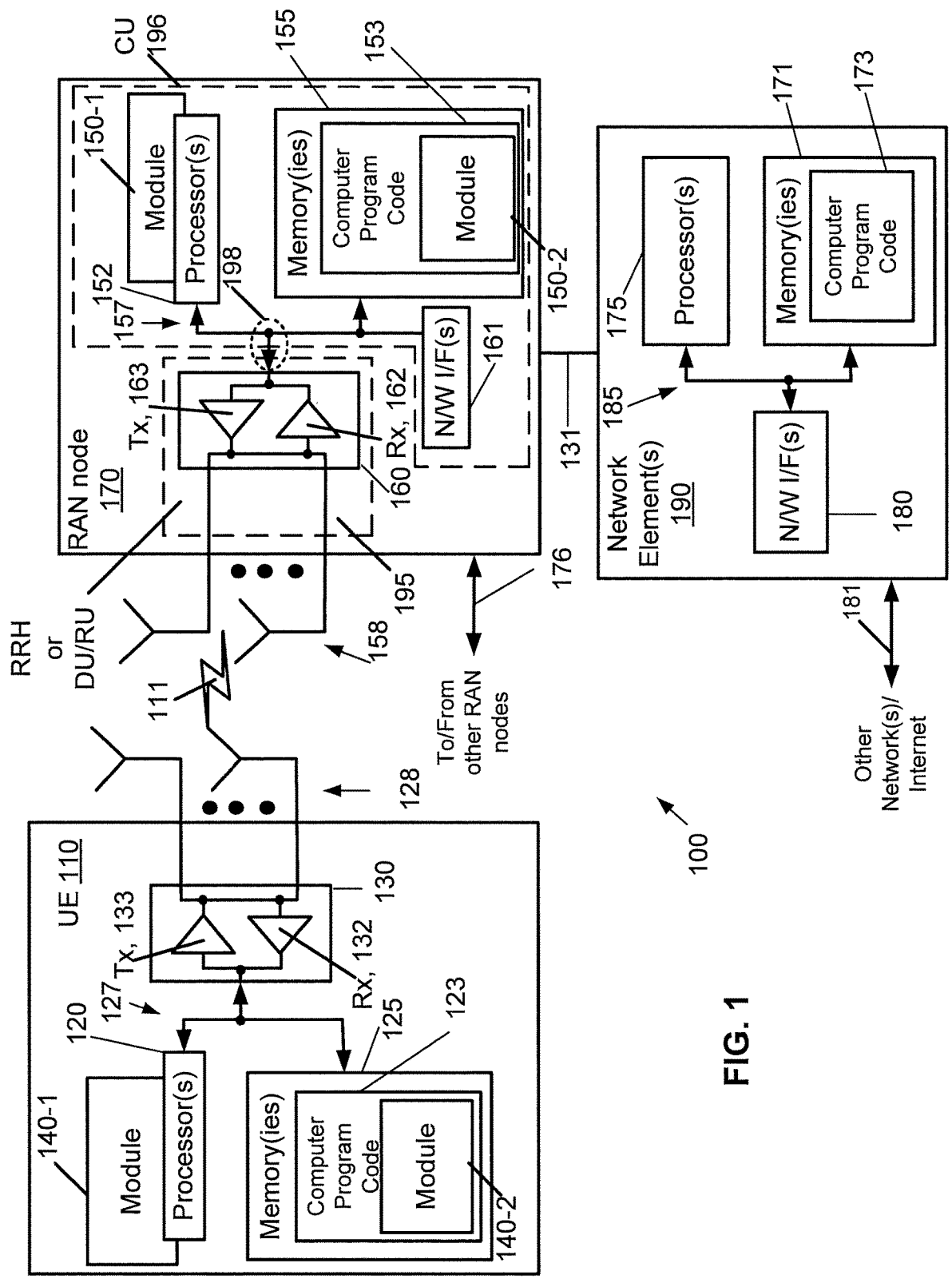
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including primary and secondary beams based channel access. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

NR design in 3GPP Release 15 was built upon a beamformed based access system. There are multiple beamforming access techniques employed in commercial networks to maximize coverage and capacity. All beams transmitted within a cell or by a transmission point (TRP) need not be equal.

As an example, in FR2, narrow beams would increase coverage of the cell, but due to their limited beamwidth they would only be able to schedule a limited number of UEs. For RF units employing analog beamforming this can hinder the spectral efficiency, since the UE in the narrow beam may not need the full cell bandwidth (or the bandwidth of all the other carriers within the same band of the RF unit). Usage of narrow beams can also be detrimental from a latency perspective due to the same reasons, i.e., number of UEs that can be scheduled per slot.

Beam management tasks are performed by the UE and its serving cell to ensure UE is scheduled by its best serving beams. A UE may be served by several beams, although some are likely to be better than others. Performance of latency sensitive applications may be impacted depending on the beam selected by a cell for channel acquisition. Serving cells typically trade-off spectral efficiency to comply with QoS requirements of certain UEs.

For 60 GHz channel access, prior to transmission, the transmitting device may need to perform a clear channel assessment based on a defined EDT:

EDT=−80 dBm+10*log10(Pmax/Pout)+10*log10 (Operating Channel BW in MHz)

Where:

Pout is the RF output power (EIRP)

Pmax is the RF outpower limit, Pout <=Pmax

For 60 GHz channel access the serving cell's EIRP could vary for different beams based on their patterns (i.e. beamwidth). This leads to a different probability of successfully accessing the channels for different beams selected for scheduling.

3GPP Release 16 multi-TRP, supports multiple-PDCCH based multi-TRP/panel transmission where each PDSCH is transmitted from a separate TRP. For CORESETs configured for the same TRP, the maximum number of monitored PDCCH candidates and non-overlapped CCEs per slot for a DL BWP is no greater than the Rel.15 limit. Joint HARQ-ACK feedback for PDSCHs received from different TRPs is supported.

Figure 2:
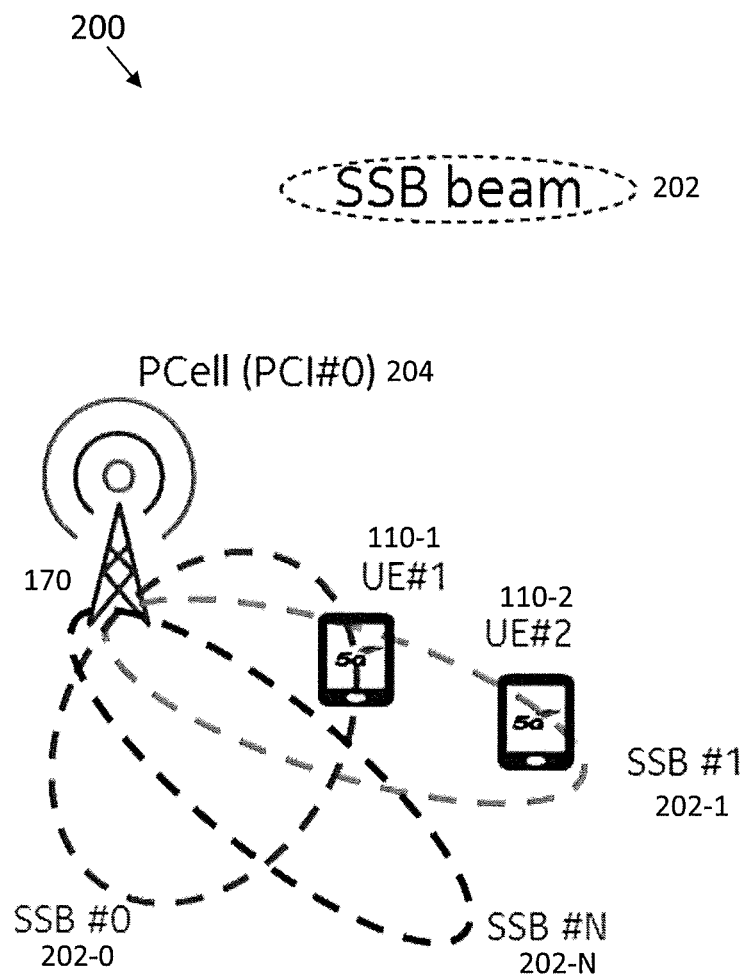
FIG. 2 illustrates the problem scenario related to beam based channel access, solved with the examples described herein.

With reference to FIG. 2, beam based cells typically have different types of beams configured, each possibly with different gains and patterns. For unlicensed access bands, different beams selected by a serving cell can lead to different outcomes during the channel acquisition process. For licensed bands, the selection of a particular beam can impact spectral efficiency and latency.

The problem therefore may be stated as, how should a serving cell select its scheduling beams in order to maximize spectral efficiency?

As shown in FIG. 2, which shows a typical beam based cell communications configuration 200, the base station 170 provides access to a PCell (PCI #0) 204. The base station 170 also provides several, or a choice of SSB beams 202, including SSB #0 202-0, SSN #1 202-1, and SSB #N 202-N. The base station 170 provides access to PCell (PCI #0) 204 for the UEs 110, including UE #1 110-1 and UE #2 110-2, via one or more of beams SSB #0 202-0, SSB #1 202-1, and SSB #N 202-N.

3GPP Multi-TRP Rel16 focused on a single DCI for URLLC and multi-DCI for the eMBB case. For this latter one there was no relationship between the DCI's or SS monitoring.

In multi-TRP Rel 17, PDCCH enhancements are focused on improving decodability of a PDCCH via PDCCH repetition.

Accordingly, the examples described herein provide a framework via which the UE can be scheduled in a slot or during the channel occupancy time (COT) for unlicensed access, with beams other than its best serving beam(s). The gNB may desire to schedule a beam which differs from a UE's best serving beam due to for example spectral efficiency, or latency/QoS requirements of other served UEs. The framework would allow a gNB to schedule a UE via beams selected from a set of secondary beams which are not the UEs configured best serving beams.

From a UE point of view, this would entail performing decoding of one or more additional hypotheses in the worst case. The first decoding hypothesis would be based on the gNB employing its best serving beams. The UE would attempt an alternative decoding hypothesis using secondary beams if the first decoding hypothesis failed. For the decoding of the one or more additional hypotheses the UE could perform these on the stored data from the first decoding attempt or the gNB could transmit the data for the alternative decoding hypothesis in a timeframe which accounts for UE processing and decoding capabilities.

A high-level description of the described framework is (1-4 immediately below):

1. UE 110 reports the (at least two) best beams (i.e. TCI states) to the gNB.

2. UE 110 receives from the gNB the configuration for (two or more) TCI states, wherein each TCI state is associated with a beam/SSB, and each TCI state may be associated with a distinct CORESETPoolIndex, in which case each CORESETPoolIndex is associated with one or more CORESETs.

3. UE 110 monitors for CORESETs according to the configured TCI state/CORESETPoolIndex, such that.the UE firstly monitors the CORESETs (or CORESETSs associated with the CORESETPoolIndex) of its best configured beam. Only if the UE does not detect the PDCCH based on its monitored CORESET of its best beam, it monitors the PDCCH in CORESETs associated with the other TCI state which may be part of a different CORESETPoolIndex. To provision for necessary processing time for PDCCH decoding at the UE, there may be a further limitation to the starting point of the PDCCH associated with the other TCI state and CORESETPoolIndex. The PDCCH may only start a predetermined number of symbols after the (start or end of) PDCCHs in the CORESET of its best beam.

4. UE 110 decodes the PDCCH and depending on the DCI, receives a PDSCH or transmits a PUSCH. To provision for necessary processing time at the UE for PDCCH decoding, there is a further limitation to the starting point of the PDSCH/PUSCH associated with the other TCI state and CORESET. The PDSCH/PUSCH may only start a predetermined number of symbols after the (start or end of) PDCCHs in the CORESET of the best configured beam or CORESET of the secondary beam.

The methods described herein can apply to single TRP and Multi-TRP deployment scenarios.

Although the above described procedure is focused on PDCCH decoding followed by PDSCH/PUSCH, the examples described herein are also applicable for PDSCH semi-persistently scheduled transmissions, where the UE 110 could apply the several beam hypothesis for decoding the PDSCH data.

The examples described herein are applicable for licensed and unlicensed bands (for example bands within FR1 and FR2). For the unlicensed bands case a BTS scheduling framework is also provided whereby, the gNB scheduler would pre-process the physical layer data for its top candidate beams to be scheduled in case the top priority beam for scheduling fails the CCA.

Figure 3:
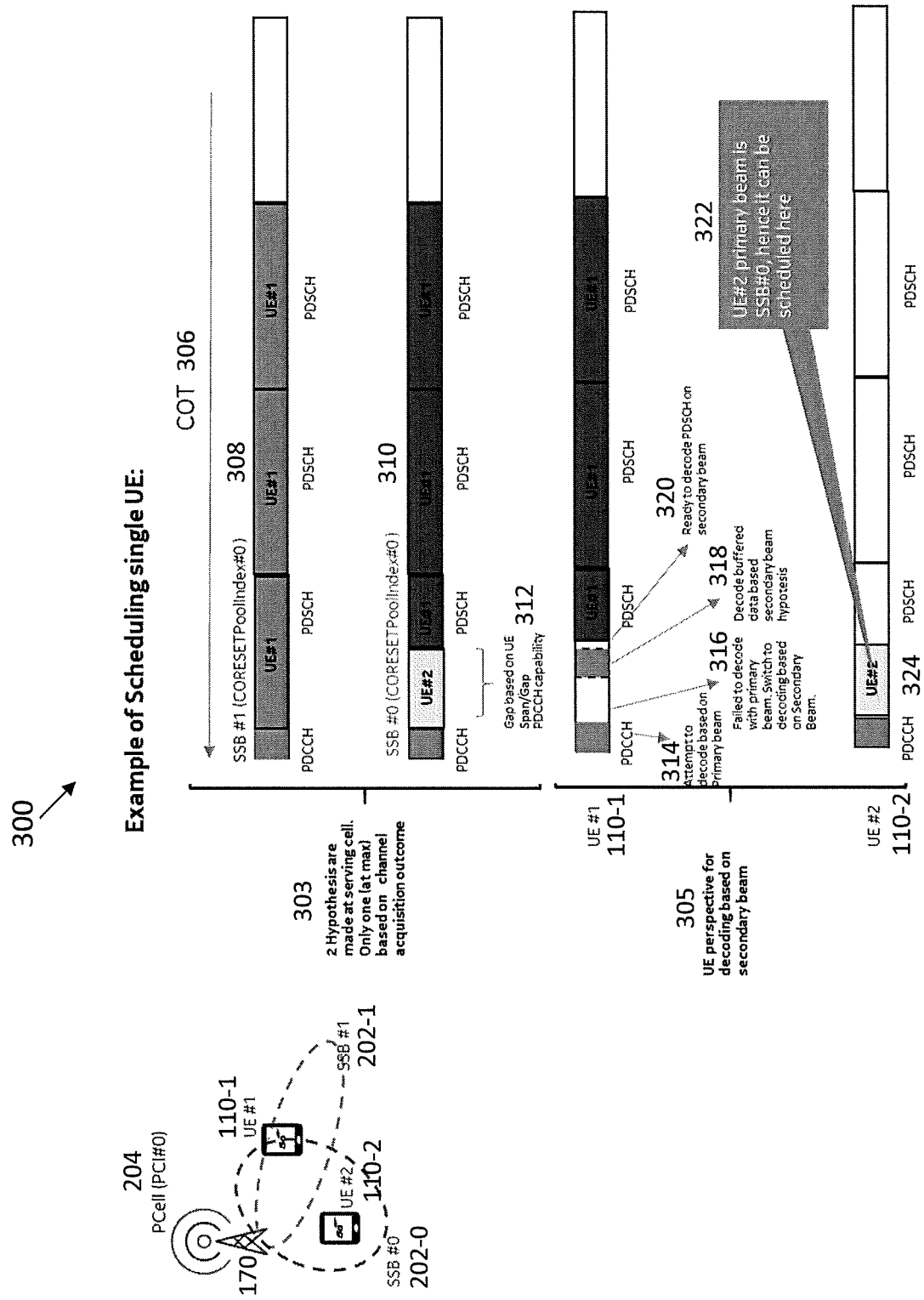
FIG. 3 shows an example of scheduling based on primary and secondary beams.

FIG. 3 provides an example 300 of primary and secondary beams based channel access. This example 300 is illustrated for an unlicensed band, such as 60 GHz. In the example, UE #1 110-1 has reported to the gNB 170 its best serving beam (SSB #1 202-1) and a secondary beam (SSB #0 202-0), whereas UE #2 110-2 only reports to the gNB 170 SSB #0 202-0 as its best serving beam. The different directivity of SSB #0 202-0 and SSB #1 202-1 would lead to differences in the EDT to be considered during the CCA procedure. For spectral efficiency the gNB scheduler (the gNB scheduler may be module 150-1 and/or module 150-2, and/or part of computer program code 173 and/or primary/secondary beam based access signaling 706), may decide to prepare two scheduling hypotheses (refer to 303) for a certain COT 306. In the first hypothesis 308 the gNB 170 assumes it would acquire the channel to transmit with a beam QCL'ed with SSB #1 in order to schedule UE #1 110-1. In the second hypothesis 310 the gNB 170 assumes that it could schedule UE #1 110-1 via a beam QCL'ed with SSB #0. In addition, since this beam 202-0 would also allow for scheduling UE #2 110-2, UE #2 110-2 is scheduled during gaps (refer to 312) allowed for UE #1 110-1 processing time. When the gNB 170 performs the channel sensing based on the energy measured, it would decide on which beam 202 and corresponding physical data to transmit. In the example 300, CCA fails for the first hypothesis 308 but is successful for the second 310.

From a UE point of view (refer to 305), UE #1 110-1 at 314 attempts PDCCH decoding (using for example module 140-1 and/or module 140-2) based on its configured best serving beam SSB #1 202-1. At 316, if it fails to decode the PDCCH it shall re-attempt to decode the PDCCH based on a secondary beam, such as SSB #0 202-0. As shown at 318, the second decoding attempt can be based on the buffered data of the first attempt or alternatively the gNB 170, could plan for transmission of UE #1 PDCCH based on the UE PDCCH decoding capabilities, such as span/gap monitoring. In all scenarios the gNB 170 should ensure that the UE #1's PDSCH is no sooner than after it has been able to decode the PDCCH. From the point of view of UE #2 110-2, since the selected scheduling beam corresponds with its only configured beam, UE #2 110-2 can be scheduled as per normal 3GPP procedures and exploit any potential gaps introduced in the scheduling for UE #1 110-1.

As further shown in FIG. 3, at 320, UE #1 110-1 is ready to decode PDSCH on the secondary beam SSB #0 202-0. As shown at 322, since the primary beam of UE #2 110-2 is SSB #0 202-2, UE #2 110-2 can be scheduled as shown at 324.

Figure 4:
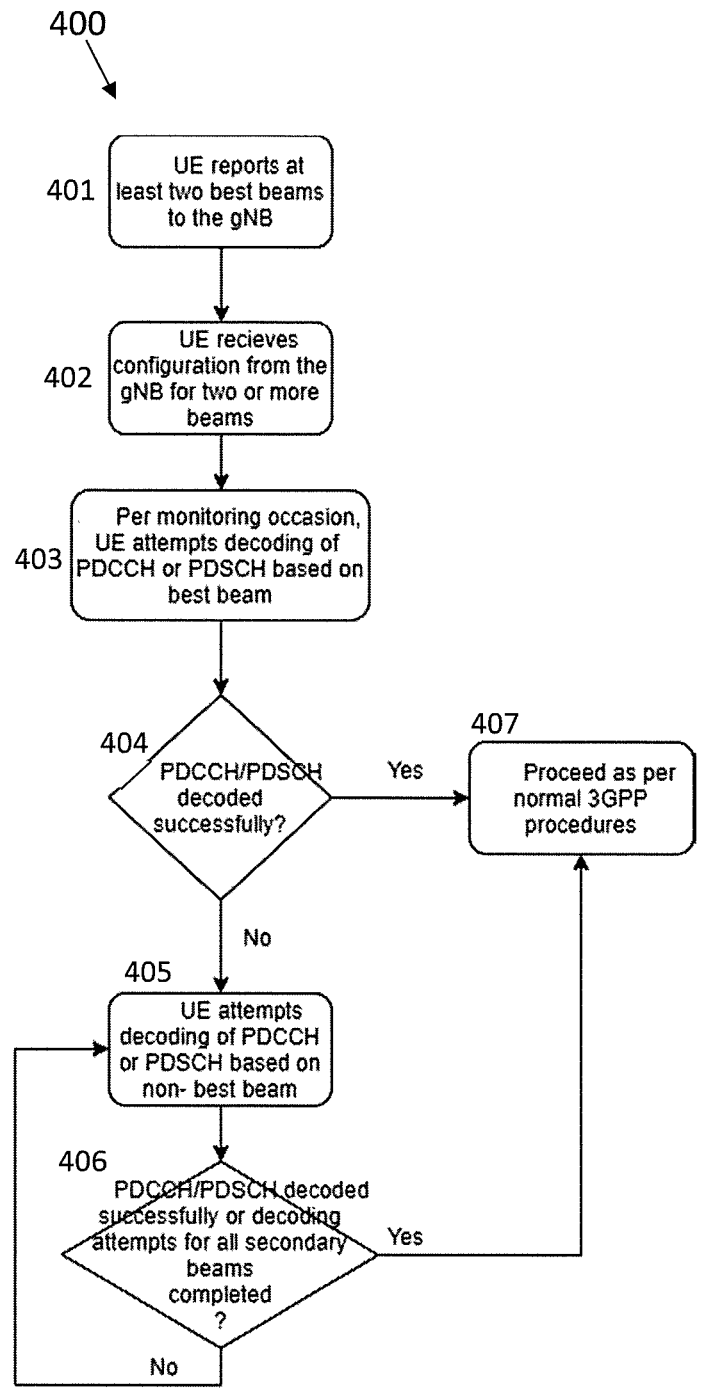
FIG. 4 is a flow chart for UE behavior, based on the examples described herein.
Figure 5:
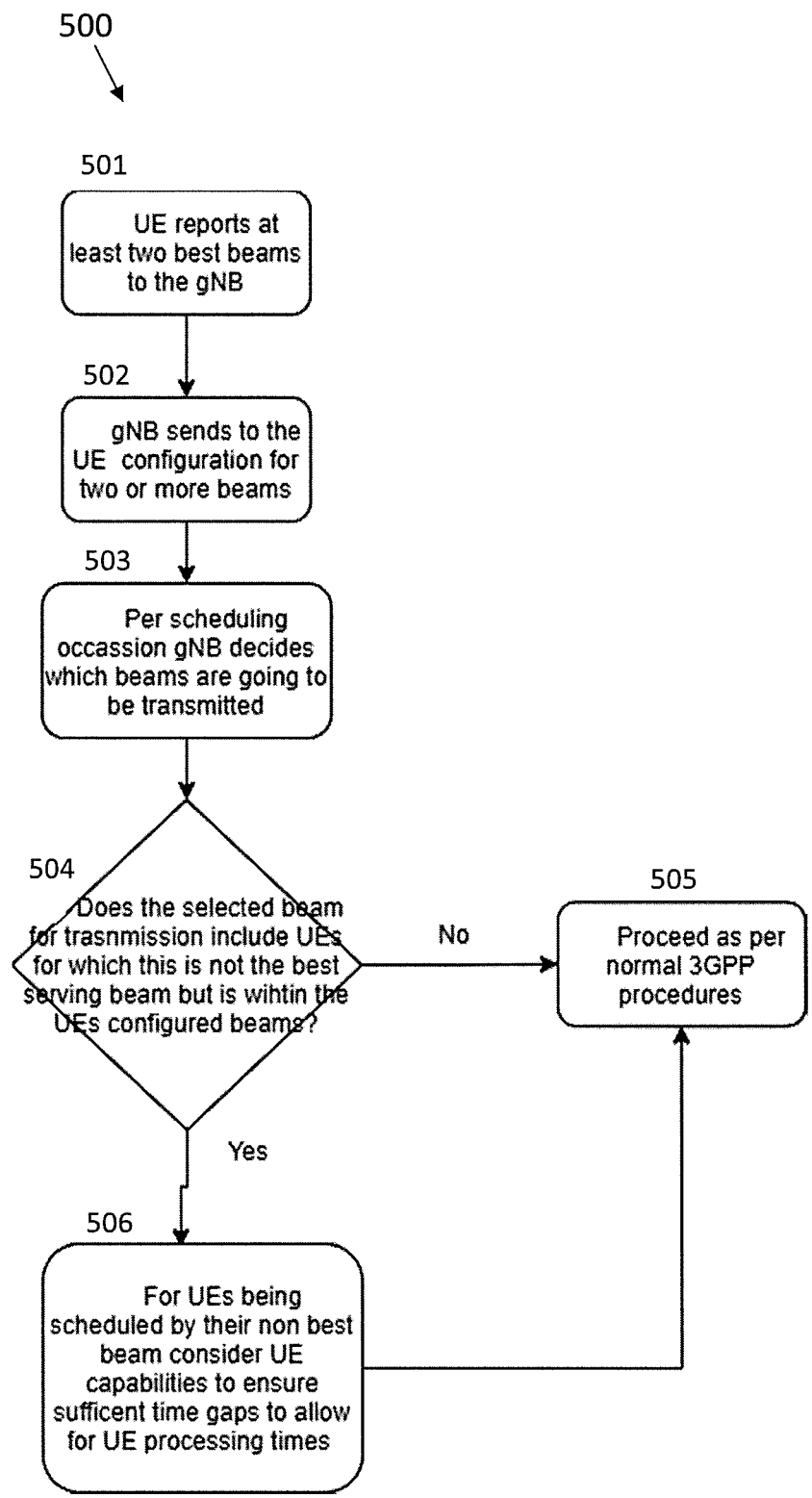
FIG. 5 is a flow chart for gNB behavior, based on the examples described herein.
Figure 6:
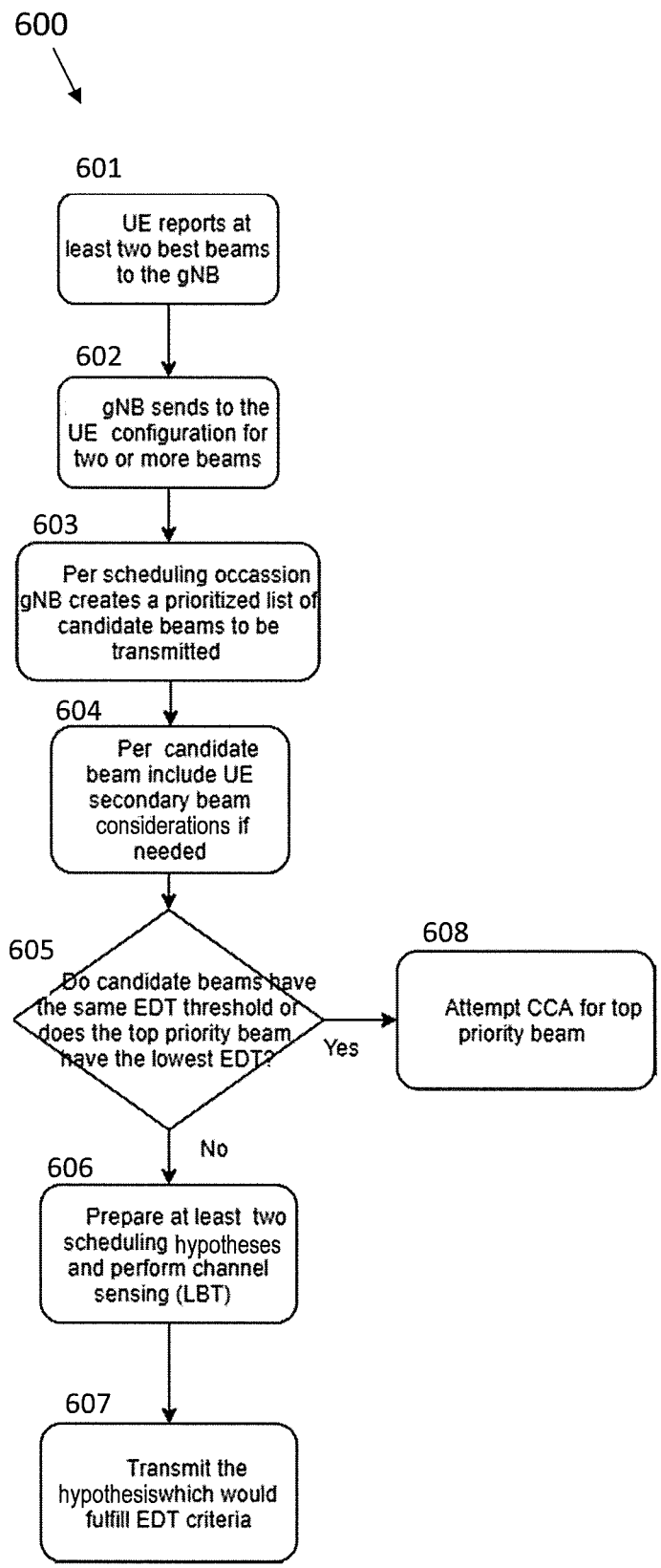
FIG. 6 is a flow chart for BTS unlicensed scheduling, based on the examples described herein.

FIG. 4 and FIG. 5 depict the UE and gNB behavior to enable the primary and secondary beam based framework. FIG. 6 depicts the gNB behavior for unlicensed bands in which a gNB scheduler can make several scheduling hypotheses to increase the spectral efficiency by means of higher probability of channel access.

In FIG. 4 the UE expected behavior 400 (using for example module 140-1 and/or module 140-2 and/or signaling 706) for the primary and secondary beams framework is depicted. In [401], a UE 110 reports more than one best beam. In [402] based on the two or more best beams reported by the UE the gNB 170 proceeds to configure the UE with the required data to enable the primary and secondary based access. In [403] per the monitoring occasion for the PDCCH or PDSCH the UE first attempts to decode the data based on its best serving beam. If the decoding is successful [404] the UE proceeds as per normal 3GPP procedures [407]. If the decoding fails in [404], the UE re-attempts the decoding based on a secondary beam [405]. This decoding attempt can be based on buffered data from the first attempt or based on a transmission aligned with the UE processing capabilities/ requirements for switching beams and decoding times. Existing capabilities could be used to determine the timing or a new capability specifically for this purpose could be introduced. The next possible scheduling occasion after processing time has passed would be used for transmission. Decoding attempts based on more than one secondary beam is not precluded [406].

FIG. 5 depicts the gNB behavior 500 (using for example module 150-1 and/or module 150-2 and/or signaling 706) to enable the primary and secondary beam based access. After the gNB 170 receives from the UE 110 a report of at least two best beams [501], the gNB proceeds to configure the UE for the primary and secondary beam based framework [502]. In [503] the gNB scheduler decides which beams to be scheduled. If the beams to be scheduled include UEs for which the selected beam is not the best serving beam [504], the gNB considers the needs of these UEs in terms of processing times [506]. If the beams to be scheduled do not include UEs for which the selected beam is not the best serving beam [504] (e.g. the scheduled beam is the primary beam for the UEs), proceed as normal per 3GPP procedures [505].

A UE may report any beam that the UE can be configured with but if there are beams which, e.g. are not transmitted then the gNB can make a determination of the best beams for the UE based on reported beams and QCL characteristics of the non-transmitted beams. Therefore it is possible to make a distinction between reported (by the UE) and configured (by the gNB) beams. Usually 3GPP specifications do not state such dependencies but the network can freely decide what to configure. In practice the reported beams and the configured beams may also be the same at least in some cases but this is not necessarily assumed. Also, there can be a different number of reported and configured beams.

FIG. 6 depicts a BTS scheduling framework 600 (using for example module 150-1 and/or module 150-2 and/or signaling 706) for unlicensed based access. In these scenarios the CCA probability can depend on the EDT, which may vary based on the beam selected for scheduling. Steps [601] and [602] are similar to those in FIG. 5. In [603], the gNB 170 creates a prioritized list of candidate beams it desires to schedule. For each of the candidate beams the gNB considers primary and secondary beams criteria as per FIG. 5 when needed [604]. If the primary beam has the lowest EDT or if all the candidate beams have the same EDT [605], the gNB proceeds with only scheduling it the top priority beam [608]. If the check in [605] results in No, the gNB may proceed with creating several scheduling hypotheses [606]. Note that LBT is typically performed at the physical layer of the RF unit, hence the creation of a scheduling hypothesis implies the gNB needs to generate the physical layer data that would need to be sent based on each of the possible scheduling hypotheses. Based on the energy sensed in the channel, the gNB would select the appropriate hypothesis for transmission based on its prioritized list of candidate beams [607].

Advantages and technical effects of the methods described herein include increased spectral efficiency and/or reduced latency by allowing the scheduler more flexibility during scheduling, especially enhancing performance of analog beamforming radio units which are employed for FR2 bands. Other advantages and technical effects include that the methods allow for higher channel access probability for unlicensed bands by being able to choose for scheduling beams with lower EDT requirements.

Figure 7:
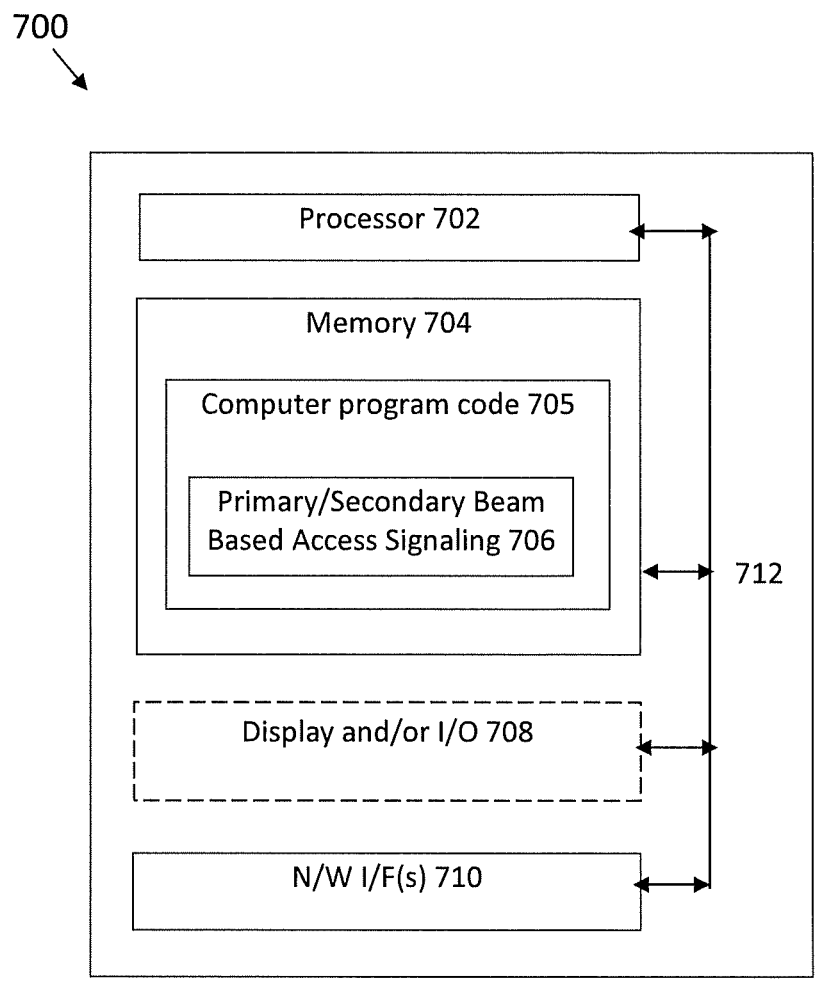
FIG. 7 is an example apparatus configured to implement primary and secondary beams based channel access, based on the examples described herein.

FIG. 7 is an example apparatus 700, which may be implemented in hardware, configured to implement the examples described herein. The apparatus 700 comprises a processor 702, at least one non-transitory or transitory memory 704 including computer program code 705, wherein the at least one memory 704 and the computer program code 705 are configured to, with the at least one processor 702, cause the apparatus 700 to implement circuitry, a process, component, module, or function (collectively primary/secondary beam based access signaling 706) to implement primary and secondary beams based channel access.

The apparatus 700 optionally includes a display and/or I/O interface 708 that may be used to display aspects or a status of the methods described herein (e.g., as one of the methods is being performed or at a subsequent time). The apparatus 700 includes one or more network (N/W) interfaces (I/F(s)) 710. The N/W I/F(s) 710 may be wired and/or wireless and communicate over the Internet/other network(s) via any communication technique. The N/W I/F(s) 710 may comprise one or more transmitters and one or more receivers. The N/W I/F(s) 710 may comprise standard well-known components such as an amplifier, filter, frequency-converter, (de)modulator, and encoder/decoder circuitries and one or more antennas.

The apparatus 700 may be UE 110, RAN node 170 or network element(s) 190 (e.g. to implement the functionality of primary/secondary beam based access signaling 706). Thus, processor 702 may correspond respectively to processor(s) 120, processor(s) 152 and/or processor(s) 175, memory 704 may correspond respectively to memory(ies) 125, memory(ies) 155 and/or memory(ies) 171, computer program code 705 may correspond respectively to computer program code 123, module 140-1, module 140-2, and/or computer program code 153, module 150-1, module 150-2, and/or computer program code 173, and N/W I/F(s) 710 may correspond respectively to N/W I/F(s) 161 and/or N/W I/F(s) 180. Alternatively, apparatus 700 may not correspond to either of UE 110, RAN node 170 or network element(s) 190, as apparatus 700 may be part of a self-organizing/optimizing network (SON) node, such as in a cloud. The apparatus 700 may also be distributed throughout the network 700 including within and between apparatus 700 and any one of the network element(s) (190) (such as a network control element (NCE)) and/or the RAN node 170 and/or the UE 110.

Interface 712 enables data communication between the various items of apparatus 700, as shown in FIG. 7. Interface 712 may be one or more buses, or interface 712 may be one or more software interfaces configured to pass data between the items of apparatus 700. For example, when interface 712 is a software interface it may in part reside instead within computer program code 705 such as within primary/secondary beam based access signaling 706. In another example, the interface 712 may be one or more buses such as address, data, or control buses, and may include any interconnection mechanism, such as a series of lines on a motherboard or integrated circuit, fiber optics or other optical communication equipment, and the like. The apparatus 700 need not comprise each of the features mentioned, or may comprise other features as well.

Figure 8:
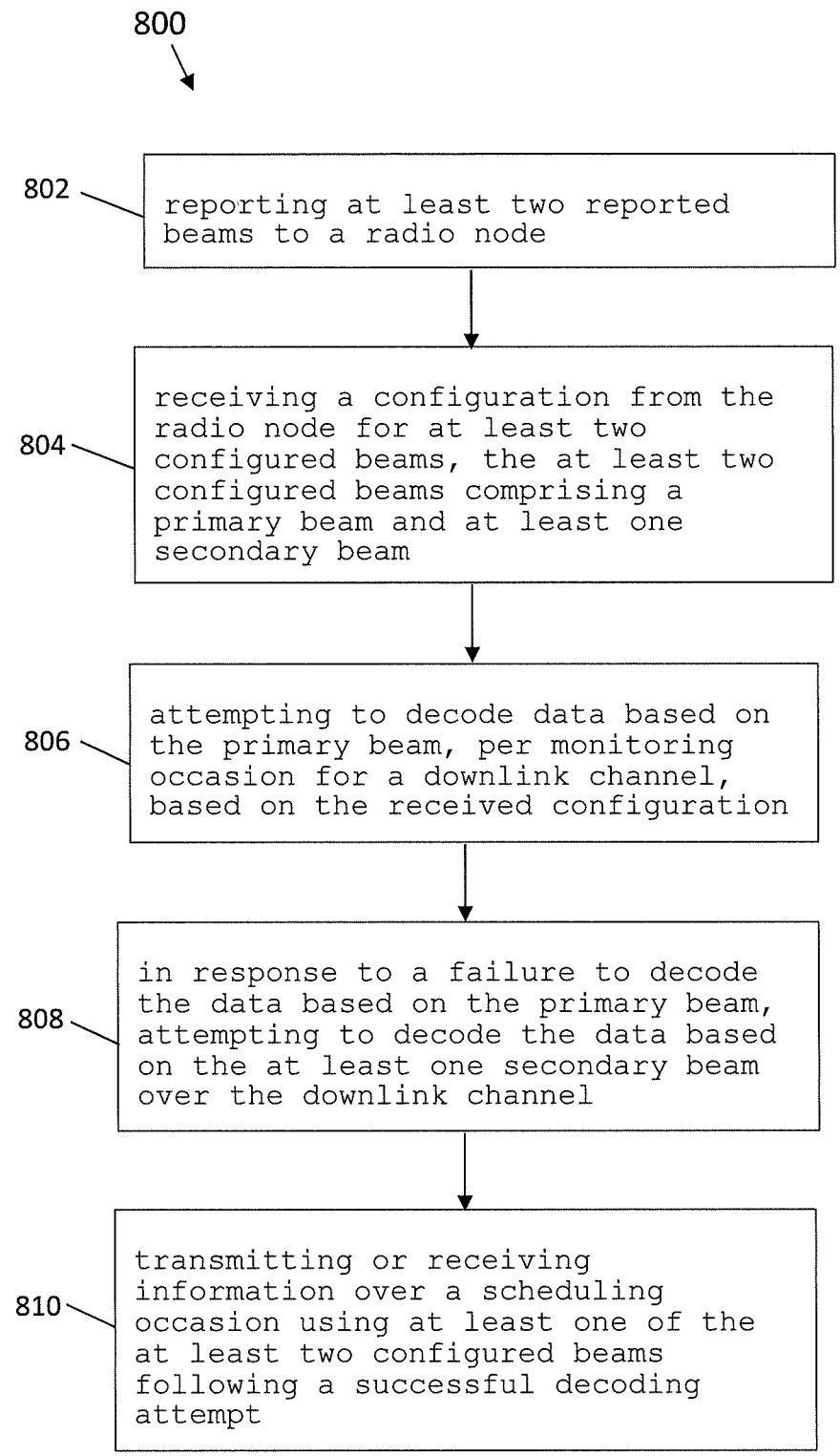
FIG. 8 is a method to implement primary and secondary beams based channel access, based on the examples described herein.

FIG. 8 is an example method 800 to implement primary and secondary beams based channel access, based on the example embodiments described herein. At 802, the method includes reporting at least two reported beams to a radio node. At 804, the method includes receiving a configuration from the radio node for at least two configured beams, the at least two configured beams comprising a primary beam and at least one secondary beam. At 806, the method includes attempting to decode data based on the primary beam, per monitoring occasion for a downlink channel, based on the received configuration. At 808, the method includes in response to a failure to decode the data based on the primary beam, attempting to decode the data based on the at least one secondary beam over the downlink channel. At 810, the method includes transmitting or receiving information over a scheduling occasion using at least one of the at least two configured beams following a successful decoding attempt. Method 800 may be performed by apparatus 700 or by UE 110, or a combination of those.

Figure 9:
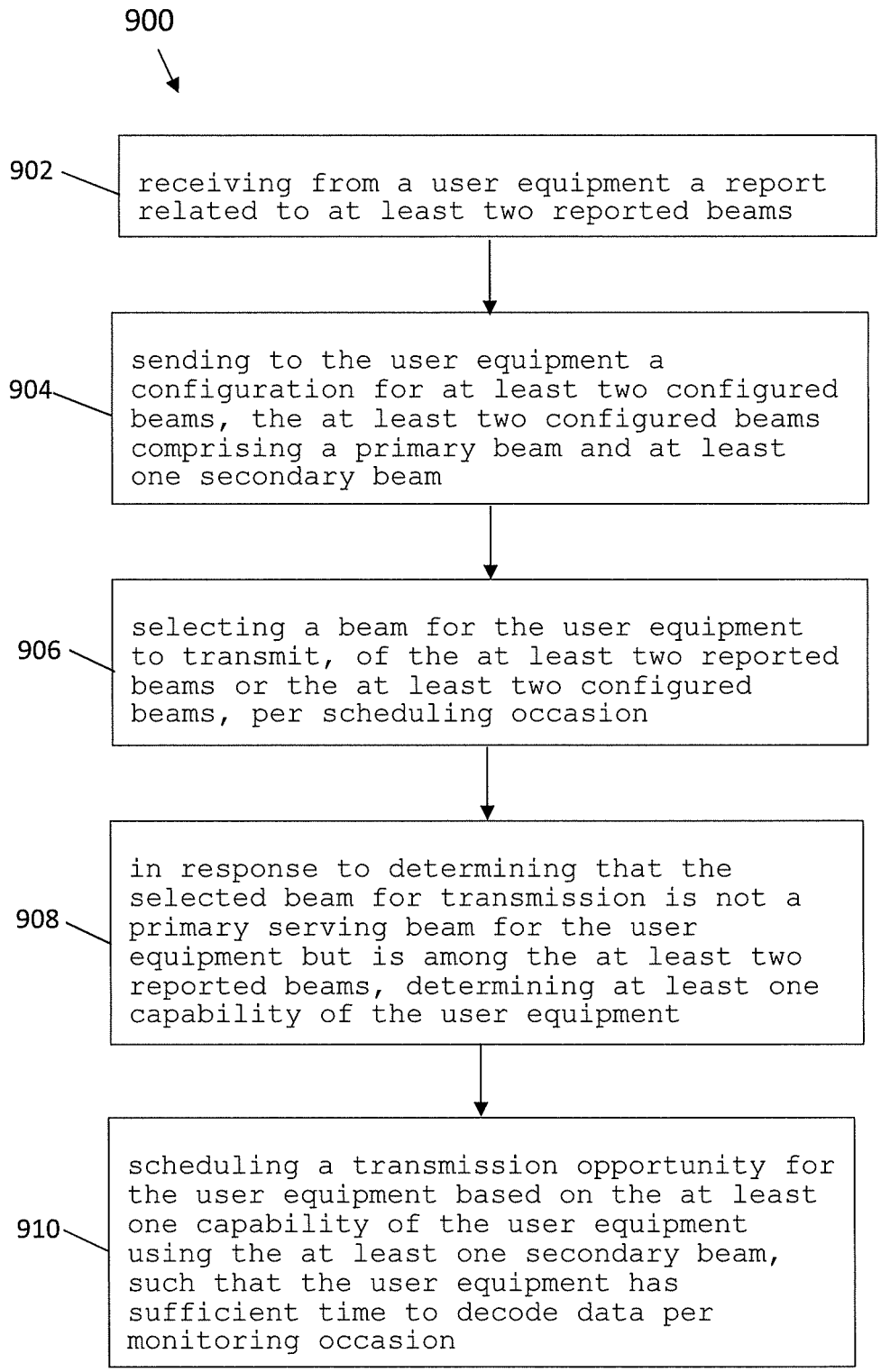
FIG. 9 is another method to implement primary and secondary beams based channel access, based on the examples described herein.

FIG. 9 is an example method 900 to implement primary and secondary beams based channel access, based on the example embodiments described herein. At 902, the method includes receiving from a user equipment a report related to at least two reported beams. At 904, the method includes sending to the user equipment a configuration for at least two configured beams, the at least two configured beams comprising a primary beam and at least one secondary beam. At 906, the method includes selecting a beam for the user equipment to transmit, of the at least two reported beams or the at least two configured beams, per scheduling occasion. At 908, the method includes in response to determining that the selected beam for transmission is not a primary serving beam for the user equipment but is among the at least two reported beams, determining at least one capability of the user equipment. At 910, the method includes scheduling a transmission opportunity for the user equipment based on the at least one capability of the user equipment using the at least one secondary beam, such that the user equipment has sufficient time to decode data per monitoring occasion. Method 900 may be performed by apparatus 700, radio node 170, or network element(s) 190, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to: report at least two reported beams to a radio node; receive a configuration from the radio node for at least two configured beams, the at least two configured beams comprising a primary beam and at least one secondary beam; attempt to decode data based on the primary beam, per monitoring occasion for a downlink channel, based on the received configuration; in response to a failure to decode the data based on the primary beam, attempt to decode the data based on the at least one secondary beam over the downlink channel; and transmit or receive information over a scheduling occasion using at least one of the at least two configured beams following a successful decoding attempt.

The apparatus may further include wherein the at least two reported beams comprise the primary beam and at least one secondary beam.

The apparatus may further include wherein the at least one memory and the computer program code are further configured to, with the at least one processor, cause the apparatus at least to: attempt to decode the data based on another secondary beam, in response to a failure to decode the data based on the at least one secondary beam, or in response to not having completed the attempting to decode the data based on the at least one secondary beam.

The apparatus may further include wherein: the attempting to decode the data based on the secondary beam is based on buffered data from the attempting to decode the data based on the primary beam; or the attempting to decode the data based on the secondary beam is based on a transmission aligned with at least one processing capability or requirement for switching beams and a decoding time required for a first decoding attempt.

The apparatus may further include wherein the attempting to decode the data and the transmitting of the information occurs during a channel occupancy time for unlicensed access.

The apparatus may further include wherein: the configuration comprises a respective at least one transmission configuration indication state associated with the at least two configured beams or a respective at least one synchronization signal block; and the configuration is received for the at least one transmission configuration indication state.

The apparatus may further include wherein each of the at least one transmission configuration indication state is associated with a control resource set pool index, where each control resource set pool index is associated with at least one control resource set.

The apparatus may further include wherein: the attempting to decode the data based on the primary beam comprises attempting to detect the downlink channel based on the at least one control resource set associated with the control resource set pool index for the primary beam; and the attempting to decode the data based on the at least one secondary beam comprises attempting to detect the downlink channel based on the at least one control resource set associated with the control resource set pool index for the at least one secondary beam.

The apparatus may further include wherein the at least one memory and the computer program code are further configured to, with the at least one processor, cause the apparatus at least to: receive an indication of a starting point of a physical downlink control channel associated with a transmission configuration indication state and control resource set pool index related to the at least one secondary beam; and wherein the starting point is a predetermined number of symbols after the start or end of a physical downlink control channel in a control resource set associated with the primary beam.

The apparatus may further include wherein the at least one memory and the computer program code are further configured to, with the at least one processor, cause the apparatus at least to: receive an indication of a starting point of a physical downlink shared channel or physical uplink shared channel associated with a transmission configuration indication state and control resource set associated with the at least one secondary beam; and wherein the starting point is a predetermined number of symbols after the start or end of the physical downlink control channel in a control resource set associated with the primary beam or the control resource set associated with the at least one secondary beam.

An example apparatus includes at least one processor; and at least one non-transitory memory including computer program code; wherein the at least one memory and the computer program code are configured to, with the at least one processor, cause the apparatus at least to: receive from a user equipment a report related to at least two reported beams; send to the user equipment a configuration for at least two configured beams, the at least two configured beams comprising a primary beam and at least one secondary beam; select a beam for the user equipment to transmit, of the at least two reported beams or the at least two configured beams, per scheduling occasion; in response to determining that the selected beam for transmission is not a primary serving beam for the user equipment but is among the at least two reported beams, determine at least one capability of the user equipment; and schedule a transmission opportunity for the user equipment based on the at least one capability of the user equipment using the at least one secondary beam, such that the user equipment has sufficient time to decode data per monitoring occasion.

The apparatus may further include wherein: the at least two reported beams comprise the primary beam and at least one secondary beam; the selected beam is among the at least two configured beams; and the at least one capability is related to span or gap monitoring.

The apparatus may further include wherein the transmission opportunity is during a channel occupancy time for unlicensed access.

The apparatus may further include wherein: the configuration comprises a respective at least one transmission configuration indication state associated with the at least two configured beams or a respective at least one synchronization signal block; and the configuration is sent for the at least one transmission configuration indication state.

The apparatus may further include wherein each of the at least one transmission configuration indication state is associated with a control resource set pool index, where each control resource set pool index is associated with one or more control resource sets.

The apparatus may further include wherein the at least one memory and the computer program code are further configured to, with the at least one processor, cause the apparatus at least to: provide an indication of a starting point of a physical downlink control channel associated with a transmission configuration indication state and control resource set pool index related to the at least one secondary beam; and wherein the starting point is a predetermined number of symbols after the start or end of a physical downlink control channel in a control resource set associated with the primary beam.

The apparatus may further include wherein the at least one memory and the computer program code are further configured to, with the at least one processor, cause the apparatus at least to: provide an indication of a starting point of a physical downlink shared channel or physical uplink shared channel associated with a transmission configuration indication state and control resource set associated with the at least one secondary beam; and wherein the starting point is a predetermined number of symbols after the start or end of the physical downlink control channel in a control resource set associated with the primary beam or the control resource set associated with the at least one secondary beam.

The apparatus may further include wherein the at least one memory and the computer program code are further configured to, with the at least one processor, cause the apparatus at least to: provide a physical downlink shared channel or physical uplink shared channel for the user equipment no sooner than after the user equipment has decoded a physical downlink control channel.

The apparatus may further include wherein the at least one memory and the computer program code are further configured to, with the at least one processor, cause the apparatus at least to: create a prioritized list of at least one candidate beam for transmission, per scheduling occasion; and in response to determining that the at least one candidate beam does not have a substantially similar energy detection threshold, or that the top priority beam does not have the lowest energy detection threshold, prepare at least two scheduling hypotheses and performing channel sensing, and transmit a hypothesis of the at least two scheduling hypotheses that fulfills an energy detection threshold criterion.

An example method includes reporting at least two reported beams to a radio node; receiving a configuration from the radio node for at least two configured beams, the at least two configured beams comprising a primary beam and at least one secondary beam; attempting to decode data based on the primary beam, per monitoring occasion for a downlink channel, based on the received configuration; in response to a failure to decode the data based on the primary beam, attempting to decode the data based on the at least one secondary beam over the downlink channel; and transmitting or receiving information over a scheduling occasion using at least one of the at least two configured beams following a successful decoding attempt.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows:

3GPP third generation partnership project
4G fourth generation
5G fifth generation
5GC 5G core network AMF access and mobility management function
ASIC application-specific integrated circuit
BTS base transceiver station
BW bandwidth
BWP bandwidth part
CCA clear channel assessment
CCE control channel element
CE control element
CORESET control resource set
COT channel occupancy time
CSS control/common search space
CU central unit or centralized unit
DCI downlink control indicator/information
DL downlink
DSP digital signal processor
DU distributed unit
EDT energy detection threshold
EIRP effective/equivalent isotropic radiated power
eMBB enhanced mobile broadband
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 control interface between the CU and the DU
feMIMO further enhanced MIMO
FFS for further study
FPGA field-programmable gate array
FR #frequency range #
gNB base station for 5G/NR, i.e., a node providing NR user plane and control plane protocol terminations towards the UE, and connected via the NG interface to the 5GC
HARQ-ACK hybrid automatic repeat request acknowledgement
ID identifier
I/F interface
I/O input/output
LBT listen before talk
LMF location management function
LTE long term evolution (4G)
MAC medium access control
MIMO multiple input multiple output
MME mobility management entity
mTRP multi-TRP
NCE network control element
ng or NG new generation
ng-eNB new generation eNB
NG-RAN new generation radio access network
NR new radio (5G)
N/W network
PCell primary cell
PCI physical cell ID
PDA personal digital assistant
PDCCH physical downlink control channel
PDCP packet data convergence protocol
PDSCH physical downlink shared channel
PHY physical layer
PUSCH physical uplink shared channel
QCL quasi co-located/location
QoS quality of service
R #RAN meeting or release
RAN radio access network
RAN1 radio layer 1 or RAN WG1 RAN meeting
Rel release
RF radio frequency
RLC radio link control
RRC radio resource control (protocol)
RRH remote radio head
RU radio unit
Rx receiver or reception
SGW serving gateway
SON self-organizing/optimizing network
SS search space
SSB synchronization signal block
TCI transmission configuration indication/indicator
TRP transmission and/or reception point
TS technical specification
Tx transmitter or transmission
UE user equipment (e.g., a wireless, typically mobile device)
UL uplink
UPF user plane function
URLLC ultra reliable low latency communication
USS user search space, or UE specific search space
WG working group
X2 network interface between RAN nodes and between RAN and the core network
Xn network interface between NG-RAN nodes

What is claimed is:

1. An apparatus comprising:
at least one processor; and
at least one non-transitory memory storing instructions that, when executed by the at least one processor, cause the apparatus at least to:
report at least two reported beams to a radio node;
receive a configuration from the radio node for at least two configured beams, the at least two configured beams comprising a primary beam and at least one secondary beam;
wherein the configuration comprises a respective at least one transmission configuration indication state associated with the at least two configured beams or a respective at least one synchronization signal block, and the configuration is received for the at least one transmission configuration indication state;
wherein each of the at least one transmission configuration indication state is associated with a control resource set pool index, where each control resource set pool index is associated with at least one control resource set;
attempt to decode data based on the primary beam, per monitoring occasion for a downlink channel, based on the received configuration;
in response to a failure to decode the data based on the primary beam, attempt to decode the data based on the at least one secondary beam over the downlink channel; and
transmit or receive information over a scheduling occasion using at least one of the at least two configured beams following a successful decoding attempt.

2. The apparatus of claim 1, wherein the at least two reported beams comprise the primary beam and at least one secondary beam.

3. The apparatus of claim 1, wherein the instructions, when executed by the at least one processor, cause the apparatus at least to:
attempt to decode the data based on another secondary beam, in response to a failure to decode the data based on the at least one secondary beam, or in response to not having completed the attempting to decode the data based on the at least one secondary beam.

4. The apparatus of claim 1, wherein:
the attempting to decode the data based on the secondary beam is based on buffered data from the attempting to decode the data based on the primary beam; or
the attempting to decode the data based on the secondary beam is based on a transmission aligned with at least one processing capability or requirement for switching beams and a decoding time required for a first decoding attempt.

5. The apparatus of claim 1, wherein the attempting to decode the data and the transmitting of the information occurs during a channel occupancy time for unlicensed access.

6. The apparatus of claim 1, wherein:
the attempting to decode the data based on the primary beam comprises attempting to detect the downlink channel based on the at least one control resource set associated with the control resource set pool index for the primary beam; and
the attempting to decode the data based on the at least one secondary beam comprises attempting to detect the downlink channel based on the at least one control resource set associated with the control resource set pool index for the at least one secondary beam.

7. The apparatus of claim 1, wherein the instructions, when executed by the at least one processor, cause the apparatus at least to:
receive an indication of a starting point of a physical downlink control channel associated with the at least one transmission configuration indication state and the control resource set pool index related to the at least one secondary beam;
wherein the starting point is a predetermined number of symbols after the start or end of a physical downlink control channel in the at least one control resource set associated with the primary beam.

8. The apparatus of claim 1, wherein the instructions, when executed by the at least one processor, cause the apparatus at least to:
receive an indication of a starting point of a physical downlink shared channel or physical uplink shared channel associated with the at least one transmission configuration indication state and the at least one control resource set associated with the at least one secondary beam;
wherein the starting point is a predetermined number of symbols after the start or end of the physical downlink control channel in the at least one control resource set associated with the primary beam or the at least one control resource set associated with the at least one secondary beam.

9. An apparatus comprising:
at least one processor; and
at least one non-transitory memory storing instructions that, when executed by the at least one processor, cause the apparatus at least to:
report at least two reported beams to a radio node;
receive a configuration from the radio node for at least two configured beams, the at least two configured beams comprising a primary beam and at least one secondary beam;
attempt to decode data based on the primary beam, per monitoring occasion for a downlink channel, based on the received configuration;
in response to a failure to decode the data based on the primary beam, attempt to decode the data based on the at least one secondary beam over the downlink channel;
transmit or receive information over a scheduling occasion using at least one of the at least two configured beams following a successful decoding attempt; and
receive an indication of a starting point of a physical downlink control channel associated with a transmission configuration indication state and control resource set pool index related to the at least one secondary beam;
wherein the starting point is a predetermined number of symbols after the start or end of a physical downlink control channel in a control resource set associated with the primary beam.

10. An apparatus comprising:
at least one processor; and
at least one non-transitory memory storing instructions that, when executed by the at least one processor, cause the apparatus at least to:
receive from a user equipment a report related to at least two reported beams;
send to the user equipment a configuration for at least two configured beams, the at least two configured beams comprising a primary beam and at least one secondary beam;
select a beam for the user equipment to transmit, of the at least two reported beams or the at least two configured beams, per scheduling occasion;
in response to determining that the selected beam for transmission is not a primary serving beam for the user equipment but is among the at least two reported beams, determine at least one capability of the user equipment; and
schedule a transmission opportunity for the user equipment based on the at least one capability of the user equipment using the at least one secondary beam, such that the user equipment has sufficient time to decode data per monitoring occasion.

11. The apparatus of claim 10, wherein:
the at least two reported beams comprise the primary beam and at least one secondary beam;
the selected beam is among the at least two configured beams; and
the at least one capability is related to span or gap monitoring.

12. The apparatus of claim 10, wherein the transmission opportunity is during a channel occupancy time for unlicensed access.

13. The apparatus of claim 10, wherein:
the configuration comprises a respective at least one transmission configuration indication state associated with the at least two configured beams or a respective at least one synchronization signal block; and
the configuration is sent for the at least one transmission configuration indication state.

14. The apparatus of claim 13, wherein each of the at least one transmission configuration indication state is associated with a control resource set pool index, where each control resource set pool index is associated with one or more control resource sets.

15. The apparatus of claim 10, wherein the instructions, when executed by the at least one processor, cause the apparatus at least to:
provide an indication of a starting point of a physical downlink control channel associated with a transmission configuration indication state and control resource set pool index related to the at least one secondary beam; and wherein the starting point is a predetermined number of symbols after the start or end of a physical downlink control channel in a control resource set associated with the primary beam.

16. The apparatus of claim 10, wherein the instructions, when executed by the at least one processor, cause the apparatus at least to:
provide an indication of a starting point of a physical downlink shared channel or physical uplink shared channel associated with a transmission configuration indication state and control resource set associated with the at least one secondary beam; and
wherein the starting point is a predetermined number of symbols after the start or end of the physical downlink control channel in a control resource set associated with the primary beam or the control resource set associated with the at least one secondary beam.

17. The apparatus of claim 10, wherein the instructions, when executed by the at least one processor, cause the apparatus at least to:
provide a physical downlink shared channel or physical uplink shared channel for the user equipment no sooner than after the user equipment has decoded a physical downlink control channel.

18. The apparatus of claim 10, wherein the instructions, when executed by the at least one processor, cause the apparatus at least to:
create a prioritized list of at least one candidate beam for transmission, per scheduling occasion; and
in response to determining that the at least one candidate beam does not have a substantially similar energy detection threshold, or that the top priority beam does not have the lowest energy detection threshold, prepare at least two scheduling hypotheses and perform channel sensing, and transmit a hypothesis of the at least two scheduling hypotheses that fulfills an energy detection threshold criterion.

19. A method comprising:
reporting at least two reported beams to a radio node;
receiving a configuration from the radio node for at least two configured beams, the at least two configured beams comprising a primary beam and at least one secondary beam;
attempting to decode data based on the primary beam, per monitoring occasion for a downlink channel, based on the received configuration;
in response to a failure to decode the data based on the primary beam, attempting to decode the data based on the at least one secondary beam over the downlink channel;
transmitting or receiving information over a scheduling occasion using at least one of the at least two configured beams following a successful decoding attempt; and
receiving an indication of a starting point of a physical downlink shared channel or physical uplink shared channel associated with a transmission configuration indication state and control resource set associated with the at least one secondary beam;
wherein the starting point is a predetermined number of symbols after the start or end of the physical downlink control channel in a control resource set associated with the primary beam or the control resource set associated with the at least one secondary beam.

20. A non-transitory computer-readable medium comprising program instructions stored thereon which are configured to, when executed with at least one processor, cause the at least one processor to perform the method of claim 19.

* * * * *